United States Patent [19]

Hamura et al.

[11] Patent Number: 5,753,577
[45] Date of Patent: May 19, 1998

[54] OLEFIN POLYMERIZATION CATALYST BASED ON ORGANOMETALLIC COMPLEXES AND PROCESS FOR PRODUCTION OF POLYOLEFINS USING THE CATALYST

[75] Inventors: Satoshi Hamura; Toru Yoshida; Morihiko Sato, all of Mie-ken, Japan

[73] Assignee: Tosoh Corporation, Shinnanyo, Japan

[21] Appl. No.: 804,397

[22] Filed: Feb. 21, 1997

[30] Foreign Application Priority Data

Feb. 23, 1996 [JP] Japan .................. 8-035972

[51] Int. Cl.$^6$ .................................................. C08F 4/64
[52] U.S. Cl. .................. 502/113; 502/108; 502/110; 502/117; 502/152; 502/155; 526/114; 526/119; 526/153; 526/134; 526/160; 526/904; 526/943
[58] Field of Search ................... 502/108, 110, 502/117, 152, 155, 113

[56] References Cited

U.S. PATENT DOCUMENTS 5,585,508  12/1996  Kuber et al. ............... 556/11
5,594,081  1/1997   Uchino et al. ............. 526/127

FOREIGN PATENT DOCUMENTS 0 255 296 A2  2/1988  European Pat. Off. .
0 664 304 A2  7/1995  European Pat. Off. .

OTHER PUBLICATIONS

Bonds, Jr., et al., "Polystrene Attached Titanocene Species. Preparation and Reactions.", Journal of the American Chemical Society, vol. 97, No. 8, Apr. 16, 1975, pp. 2128–2132.

*Primary Examiner*—David W. Wu
*Attorney, Agent, or Firm*—Oblon, Spivak, McClelland, Maier & Neustadt, P.C.

[57] ABSTRACT

A novel class of olefin polymerization catalyst system based on specific organo-transition metal compounds and which are effective for controlling in particular the width and mode of the molecular weight distribution of the resulting polyolefins, and processes of olefin polymerization using the novel catalyst systems are disclosed.

13 Claims, No Drawings

OLEFIN POLYMERIZATION CATALYST BASED ON ORGANOMETALLIC COMPLEXES AND PROCESS FOR PRODUCTION OF POLYOLEFINS USING THE CATALYST

BACKGROUND OF THE INVENTION

This invention relates to novel olefin polymerization catalyst systems based on organometallic complexes and to novel olefin polymerization processes using such catalyst systems. In particular, the invention concerns processes for manufacturing efficiently polyolefins of commercially valuable properties by employing said novel catalyst systems.

The so-called "Kaminsky catalyst" that consists of an aluminoxane in combination with a compound of a transition metal from Group 4 of the periodic table having a cyclopentadienyl ligand or ligands is highly active in olefin polymerization processes and is useful for production of polyolefins as described, for example, in Japanese Patent Public Disclosure, KOKAI, No. 58-19309.

It is known that where the Kaminsky catalyst comprising, as a main catalyst, such an organometallic complex having cyclopentadienyl groups is used in an olefin polymerization process, the resulting polyolefin is a polymer exhibiting a narrow molecular weight distribution and a homogeneous compositional distribution. Though the product polymer shows less sticking properties when formed into moldings such as film and sheet, the narrow molecular weight presents a problem that an increased amount of energy is required when the polymer is processed, for example, in extrusion and other in-mold thermoforming. Therefore, there is a great need for developing a catalyst that is effective for producing polyolefins that are of less sticking properties as well as of good processability during molding process.

In order to solve the above problem, it has been proposed to use two or more organo-transition metal compounds in combination for olefin polymerization so as to produce a polyolefin of a broader molecular weight distribution, for example, in Japanese Patent Public Disclosure, KOKAI, Nos. 60-35006 and 60-35008.

Further, a catalyst system comprising, as a main catalyst, an organo-transition metal compound having two transition metal atoms in the molecule has been reported. For example, Japanese Patent Public Disclosure, KOKAI, No. 7-126315 discloses an olefin polymerization catalyst comprising fulvalene bis [(cyclopentadienyl) zirconium dimethyl], and an olefin polymerization process using the catalyst. Japanese Patent Public Disclosure, KOKAI, No. 7-233211 describes an olefin polymerization catalyst system comprising, as a main catalyst, an organometallic complex containing two zirconium atoms in the molecule as represented by [Me$_2$Si (Cp)$_2$](CpZrCl$_2$)$_2$, and an olefin polymerization process using the catalyst system.

SUMMARY OF THE INVENTION

An object of the invention is to provide novel olefin polymerization catalysts that allow one to produce efficiently polyolefins of commercially valuable properties.

It is another object of the invention to provide novel olefin polymerization processes wherein said catalysts are employed.

Other objects and features of the invention will become apparent in the below description.

The inventors have concentrated their effort and study on achievement of the objects. As a result, a novel catalyst systems which enable one to efficiently produce polyolefins of commercially valuable properties, have been created by employing, as a catalytic component, an organo-transition metal compound of a specific structure, in conjunction with specific activator cocatalysts. The invention has been thus accomplished on the basis of creation of the catalysts.

According to the invention, an olefin polymerization catalyst system which comprises:

an organo-transition metal compound (A) represented by the following general formula (1), (2) or (3)

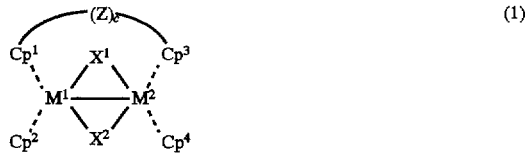
(1)

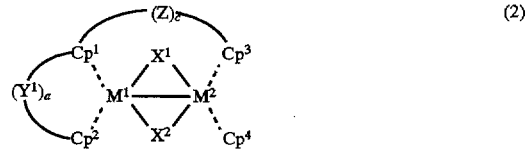
(2)

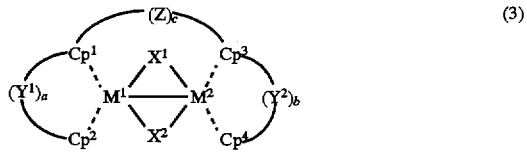
(3)

wherein M$^1$ and M$^2$, which may be the same or different, are each a transition metal atom selected from the group consisting of Ti, Zr and Hf, the left-hand Cp$^1$ and Cp$^2$ and the right-hand Cp$^3$ and Cp$^4$, which may be the same or different, represent each a C$_{3-60}$ π-bonding cyclic unsaturated hydrocarbon radical which may contain a hetero-atom or atoms, and are bonded to said transition metals M$^1$ and M$^2$, respectively, X$^1$ and X$^2$, which may be the same or different, represent each a hydrogen atom, a C$_{1-20}$ hydrocrbon radical, a halogen atom or a substituent containing an atom or atoms from Group 16 of the periodic table, Y$^1$ and Y$^2$, which may be the same or different, are each a C$_{1-60}$ hydrocarbon radical, a C$_{1-20}$ alkylated and/or arylated silyl radical or a C$_{1-20}$ alkylated and/or arylated siloxyl radical, Y$^1$ being a crosslink bridging between Cp$^1$ and Cp$^2$, Y$^2$ being a crosslink bridging between Cp$^3$ and Cp$^4$, Z is a crosslinking group bridging between Cp$^1$ and Cp$^3$ and represents a C$_{1-20}$ hydrocarbon radical, C$_{1-20}$ alkylated and/or arylated silyl radical, or C$_{1-20}$ alkylated and/or arylated siloxyl radical, a and b represent each an integer of 1 or 2, where both a and b are 2, the corresponding Y$^1$ or Y$^2$ groups may be the same or different, c represents an integer of 0 or 1, where c is 0, Cp$^1$ and Cp$^2$ being directly bonded, and where c is 1, a crosslinking group Z being present between Cp$^1$ and Cp$^3$;

an activator cocatalyst (B) represented by the following general formula (4), (5), (6) or (7):

[HL$^1$][B(Ar)$_4$]    (4)

$$[AL^2{}_m][B(Ar)_4] \quad (5)$$

$$[D][B(Ar)_4] \quad (6)$$

$$B(Ar)_3 \quad (7)$$

wherein H is a proton,

B is a boron atom or an aluminium atom, $L^1$ is a Lewis base, $L^2$ is a Lewis base or a cyclopentadienyl group, A is a cation of a metal selected from lithium, iron and silver, D is a carbonium cation or a tropylium cation, Ar is a halogen-substituted $C_{6-20}$ aryl radical, and m is an integer of from 0 to 2; and optionally, an organo-aluminium compound (C).

Further, the present invention provides another olefin polymerization catalyst system which comprises:

the above-defined organo-transition metal compound of general formula (1), (2) or (3);

an activator cocatalyst represented by the following general formula (8) or (9)

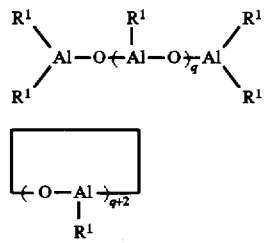

(8)

(9)

wherein groups $R^1$, which may be the same or different, represent each a hydrogen atom or a $C_{1-20}$ hydrocarbon radical, and q represents an integer ranging from 2 to 60; and optionally, an organo-aluminium compound.

According to a yet further embodiment of the invention, there is provided an olefin polymerization catalyst system which comprises the above-defined organo-transition metal compound of general formula (1), (2) or (3), a clay mineral, and optionally an organo-aluminium compound.

According to the invention, a solid catalyst for use in olefin polymerization, which comprises any one of the above-specified catalyst systems optionally containing the organo-aluminium compound, and a fine particle support material on which the selected catalyst system is supported.

Further, the invention provides a solid catalyst for use in olefin polymerization which is prepared by preliminarily polymerizing a selected olefin monomer onto the above-specified solid catalyst.

The invention provides olefin polymerization processes in which the above-defined various catalyst systems are employed.

DETAILED DESCRIPTION OF THE INVENTION

The invention will be described in more detail.

The organo-transition metal compounds that may be used as a main catalyst in the olefin polymerization catalyst systems according to the invention are represented by the general formula (1), (2) or (3) and are characterized by the fact that they contain two transition metal atoms $M^1$ and $M^2$ which are linked together by a direct $M^1$–$M^2$ bond in addition to two crosslinking moieties $X^1$ and $X^2$ bridging therebetween and, formally have each an oxidation number of 3.

In the general formula, $M^1$ and $M^2$, may be the same or different, are each an atom of transition metal selected from the group consisting of titanium, zirconium and hafnium of the periodic table.

Each of $M^1$ and $M^2$ is trivalent as a matter of form.

The left-hand $Cp^1$ and $Cp^2$ and the right-hand $Cp^3$ and $Cp^4$, which may be the same or different, represent each a $C_{3-60}$ π-bonding cyclic unsaturated hydrocarbon radical which may contain a hetero atom or atoms, and are bonded to said transition metals $M^1$ and $M^2$, respectively. Said hetero-atom or atoms may be of oxygen, sulfur, nitrogen, phospher and/or silicon.

Particular examples of $Cp^1$ and $Cp^3$ which may be mentioned, include cyclopentadienyl and indenyl groups. These groups may have a substituent or substituents, for example, an alkyl group, such as methyl, ethyl, isopropyl or tert-butyl group; benzyl group; phenyl group; a silyl group, such as trimethyl silyl, dimethyl phenyl silyl or triphenyl silyl; an alkoxy group, such as methoxy, ethoxy or isopropoxyl; phenoxy group; and an amino group, such as dimethyl amino, diethyl amino, di-isopropyl amino, diphenyl amino or dibenzyl amino.

Paricular exmaples of $Cp^2$ and $Cp^4$, that may be mentioned, include cyclopentadienyl, indenyl and fluorenyl groups. These groups may have a substituent or substituents, for example, an alkyl group, such as methyl, ethyl, isopropyl or tert-butyl; benzyl group; phenyl group; a silyl group, such as trimethyl silyl, dimethyl phenyl silyl or triphenyl silyl; an alkoxy group, such as methoxy, ethoxy or iso-proxyl; phenoxy group; and an amino group, such as dimethyl amino, diethyl amino, di-isopropyl amino, diphenyl amino or dibenzyl amino.

$X^1$ and $X^2$ may be the same or different and function each as a crosslinker bridging between the two transition metal atoms $M^1$ and $M^2$ in the organo-transition metal compound. Paricular examples, that may be mentioned, include hydrogen atom; a hydrocarbon group, such as methyl, ethyl, propyl, iso-propyl or butyl; a halogen atom, such as fluorine, chlorine, bromine or iodine; and a substituent containing an atom or atoms such as oxygen and sulfur from Group 16 of the periodic table. Preferably, $X^1$ and $R^2$ represent each a hydrogen atom or a halogen atom.

$Y^1$ and $Y^2$ may be the same or different and represent each a $C_{1-60}$ hydrocarbon radical, a $C_{1-20}$ alkylated and/or arylated silyl radical. $Y^1$ acts or a crosslinker bridging between $Cp^1$ and $Cp^2$, while $Y^2$ acts as a crosslinker bridging between $Cp^3$ and $Cp^4$.

Preferably, $Y^1$ and $Y^2$ have a structure of the general formula (10):

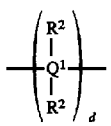

(10)

wherein $Q^1$ or $Q^1$s, which may be the same or different, represent each a carbon, silicon or oxygen atom, $R^2$s, which may be the same or different, represent each a hydrogen atom; a $C_{1-20}$ hydrocarbon radical, such as methyl, ethyl, propyl, iso-propyl, butyl, tert-butyl, phenyl or benzyl group; a $C_{1-20}$ alkoxy group, such as methoxy; or a $C_{1-20}$ alkylated and/or arylated silyl group, such as trimethyl silyl, and d is an integer of from 1 to 5.

Particular examples of $Y^1$ and $Y^2$, that may be mentioned, include alkylene groups, such as methylene, dimethyl methylene, phenyl methyl methylene, diphenyl methylene, ethylene and propylene; and alkylated and/or arylated silanediyl, such as dimethyl silanediyl, methyl phenyl silanediyl and diphenyl-silanedlyl.

Z, If present, represents a $C_{1-20}$ hydrocarbon radical or a $C_{1-20}$ alkylated and/or arylated siloxy radical, and acts to crosslink $Cp^1$ and $Cp^3$. Preferably, Z has a structure of the general formula (11):

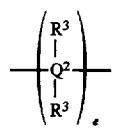
(11)

wherein $Q^2$ and $Q^2$s, which may be the same or different, represent each a carbon, silicon or oxygen atom, $R^3$ or $R^3$s, which may be the same or different, represent each a hydrogen atom; a $C_{1-20}$ hydrocarbon radical, such as methyl, ethyl, propyl, isopropyl, butyl, tert-butyl, phenyl or benzyl; a $C_{1-20}$ alkoxy group such as methoxy; or a $C_{1-20}$ alkylated and/or arylated silyl group such as trimethyl silyl, and e is an integer of from 1 to 20.

Particular examples of Z, that may be mentioned, include alkylenes, such as methylene, dimethylmethylene, phenylmethyl methylene, diphenyl methylene, ethylene and propylene; and alkylated and/or arylated silanediyl, such as dimethyl silanediyl, methyl phenyl silanediyl and diphenyl silanediyl.

In the general formulae (2) and (3), a and b, that may be the same or different, represent each an integer of 1 or 2; where a is equal to 1, $Cp^1$ and $Cp^2$ are crosslinked via a single crosslinking moiety; where a is equal to 2, $Cp^1$ and $Cp^2$ are crosslinked via two crosslinking moieties; where b is equal to 1, $Cp^3$ and $Cp^4$ are crosslinked via a single crosslinking moeity; and where b is equal to 2, $Cp^3$ and $Cp^4$ are crosslinked via two crosslinking moieties.

In the general formulae (1), (2) and (3), c is an integer of 0 or 1; where c is zero, $Cp^1$ and $Cp^3$ are directly bonded; and where c is equal to 1, $Cp^1$ and $Cp^3$ are crosslinked via a single crosslinking moiety Z.

The organo-transition metal compounds (1) used in the invention may be synthesized by known techniques described, for example, in Angew, Chem. Int. Ed. Engl., Vol. 25 (1986), page 289; and Organometallics, Vol.6 (1987), page 897. For example, as shown in the following scheme, a transition metal compound of the general formula (12) may be treated with two equivalents of n-BuLi followed by another transition metal compound of the general formula (13) to synthesize a desired organo-transition metal compound.

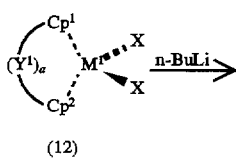
(12)

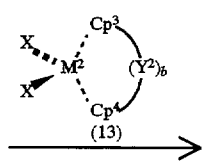
(13)

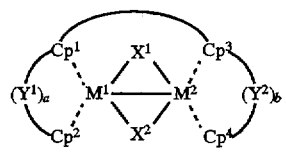

Some examples of the organo-transition metal compounds of the general formulae (1), (2) and (3) according to the invention will be set forth below:

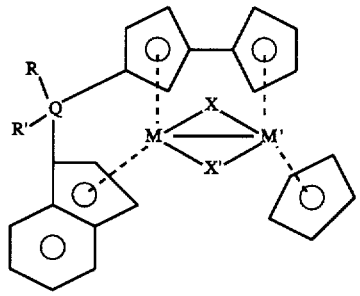

M = Ti, Zr or Hf
M' = Ti, Zr or Hf
X = H or Cl
X' = H or Cl
R = H, CH₃ or Ph
R' = H, CH₃ or Ph
Q = C or Si

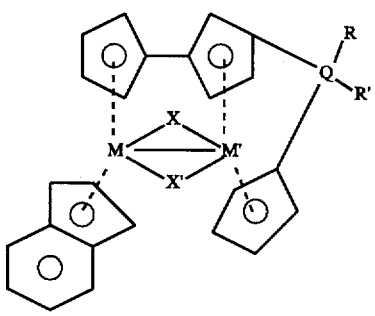

M = Ti, Zr or Hf
M' = Ti, Zr or Hf
X = H or Cl
X' = H or Cl
R = H, CH₃ or Ph
R' = H, CH₃ or Ph
Q = C or Si

-continued

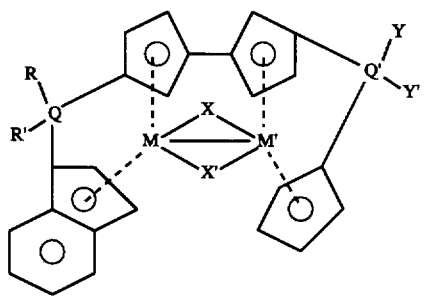

M = Ti, Zr or Hf
M' = Ti, Zr or Hf
X = H or Cl
X' = H or Cl
R = H, CH$_3$ or Ph
R' = H, CH$_3$ or Ph
Y = H, CH$_3$ or Ph
Y' = H, CH$_3$ or Ph
Q = C or Si
Q' = C or Si

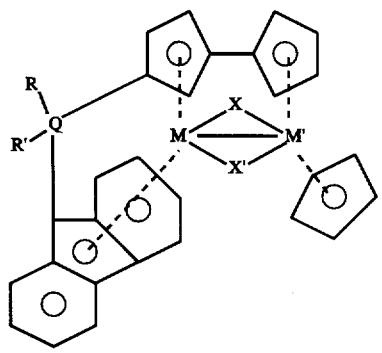

M = Ti, Zr or Hf
M' = Ti, Zr or Hf
X = H or Cl
X' = H or Cl
R = H, CH$_3$ or Ph
R' = H, CH$_3$ or Ph
Q = C or Si

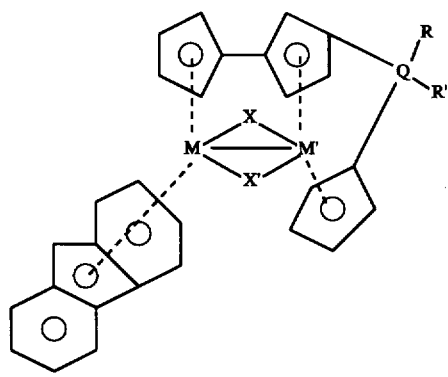

M = Ti, Zr or Hf
M' = Ti, Zr or Hf
X = H or Cl
X' = H or Cl
R = H, CH$_3$ or Ph
R' = H, CH$_3$ or Ph
Q = C or Si

-continued

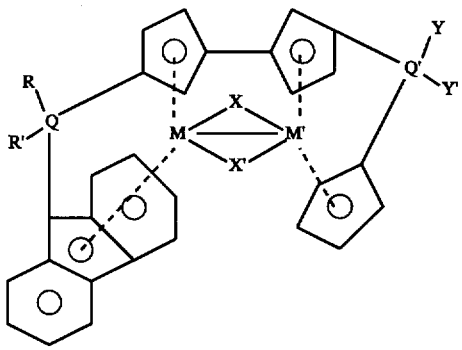

M = Ti, Zr or Hf
M' = Ti, Zr or Hf
X = H or Cl
X' = H or Cl
R = H, CH$_3$ or Ph
R' = H, CH$_3$ or Ph
Y = H, CH$_3$ or Ph
Y' = H, CH$_3$ or Ph
Q = C or Si
Q' = C or Si

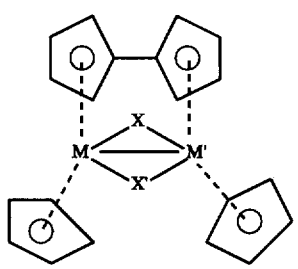

M = Ti, Zr or Hf
M' = Ti, Zr or Hf
X = H or Cl
X' = H or Cl

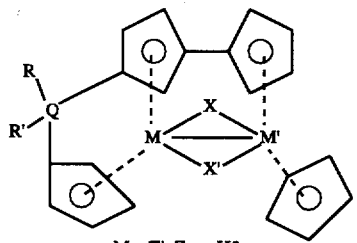

M = Ti, Zr or Hf
M' = Ti, Zr or Hf
X = H or Cl
X' = H or Cl
R = H, CH$_3$ or Ph
R' = H, CH$_3$ or Ph
Q = C or Si

-continued

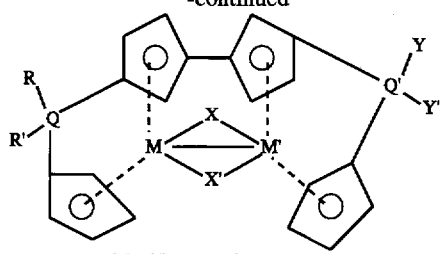

M = Ti, Zr or Hf
M' = Ti, Zr or Hf
X = H or Cl
X' = H or Cl
R = H, CH₃ or Ph
R' = H, CH₃ or Ph
Y = H, CH₃ or Ph
Y' = H, CH₃ or Ph
Q = C or Si
Q' = C or Si

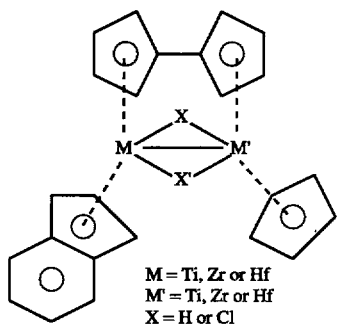

M = Ti, Zr or Hf
M' = Ti, Zr or Hf
X = H or Cl
X' = H or Cl

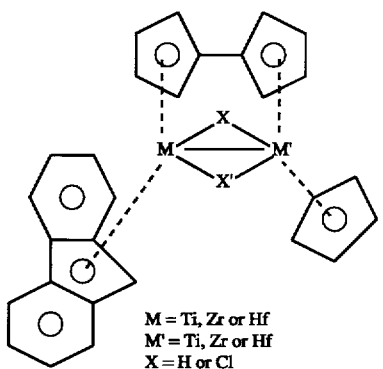

M = Ti, Zr or Hf
M' = Ti, Zr or Hf
X = H or Cl
X' = H or Cl

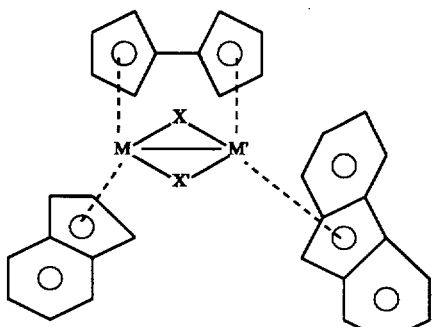

M = Ti, Zr or Hf
M' = Ti, Zr or Hf
X = H or Cl
X' = H or Cl

-continued

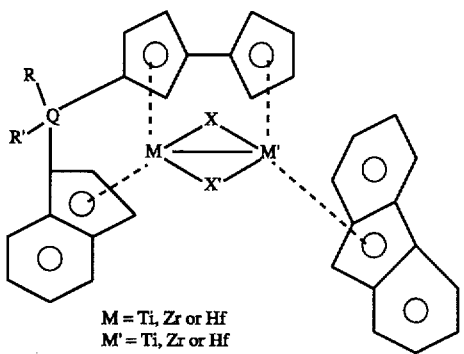

M = Ti, Zr or Hf
M' = Ti, Zr or Hf
X = H or Cl
X' = H or Cl
R = H, CH₃ or Ph
R' = H, CH₃ or Ph
Q = C or Si

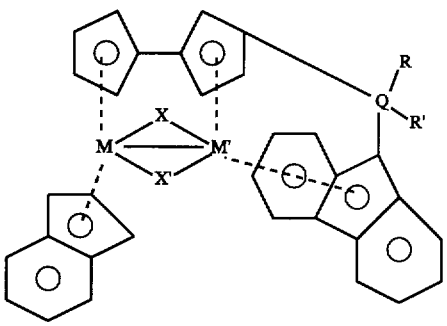

M = Ti, Zr or Hf
M' = Ti, Zr or Hf
X = H or Cl
X' = H or Cl
R = H, CH₃ or Ph
R' = H, CH₃ or Ph
Q = C or Si

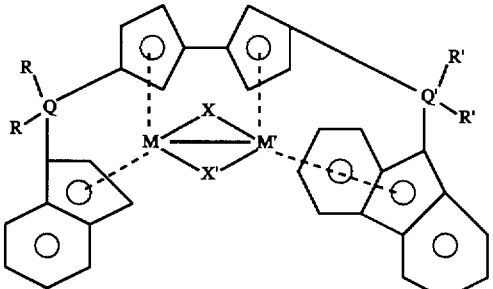

M = Ti, Zr or Hf
M' = Ti, Zr or Hf
X = H or Cl
X' = H or Cl
R = H, CH₃ or Ph
R' = H, CH₃ or Ph
Y = H, CH₃ or Ph
Y' = H, CH₃ or Ph
Q = C or Si
Q' = C or Si

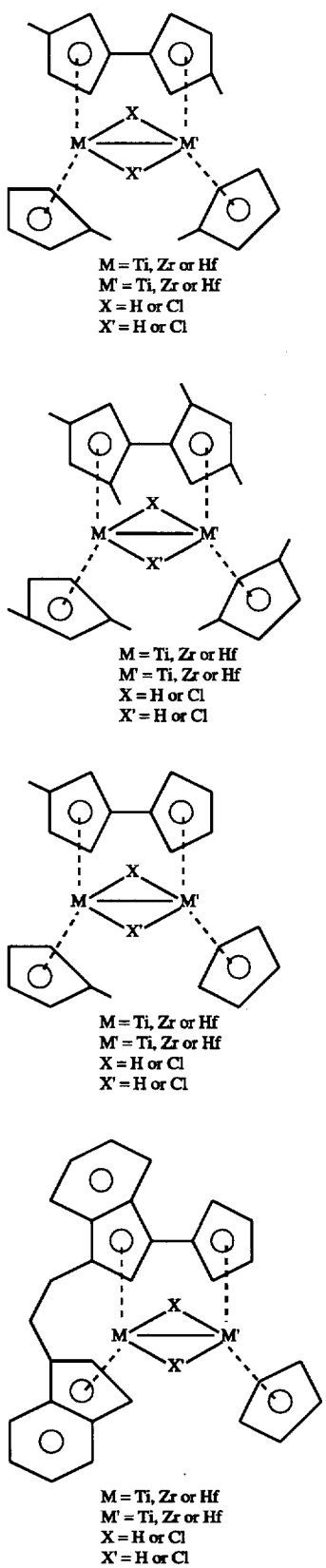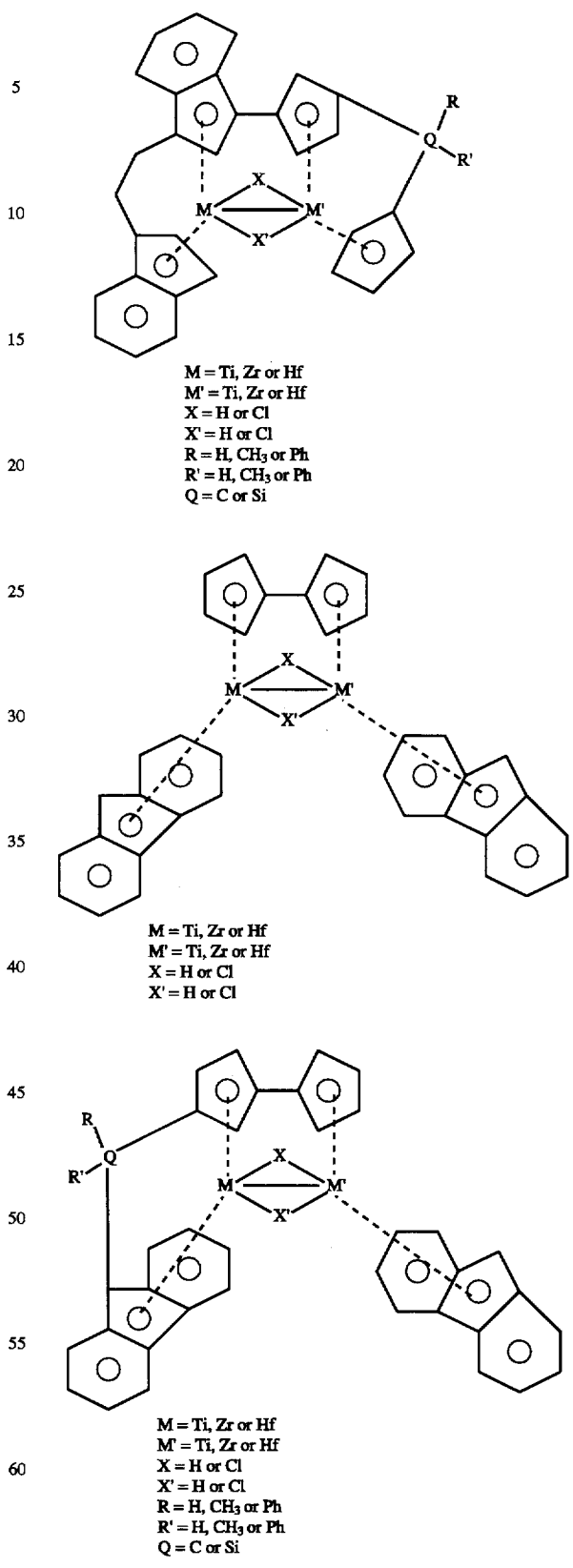

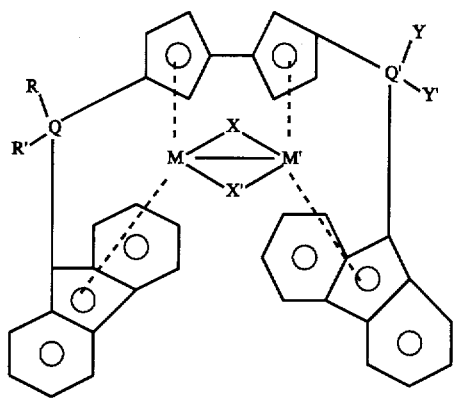

M = Ti, Zr or Hf
M' = Ti, Zr or Hf
X = H or Cl
X' = H or Cl
R = H, CH₃ or Ph
R' = H, CH₃ or Ph
Y = H, CH₃ or Ph
Y' = H, CH₃ or Ph
Q = C or Si
Q' = C or Si

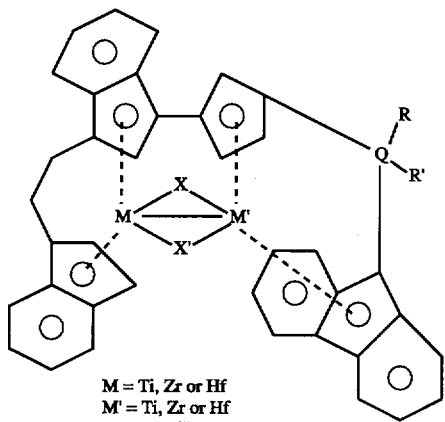

M = Ti, Zr or Hf
M' = Ti, Zr or Hf
X = H or Cl
X' = H or Cl
R = H, CH₃ or Ph
R' = H, CH₃ or Ph
Q = C or Si

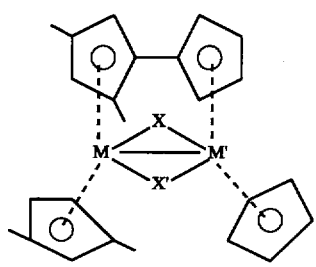

M = Ti, Zr or Hf
M' = Ti, Zr or Hf
X = H or Cl
X' = H or Cl

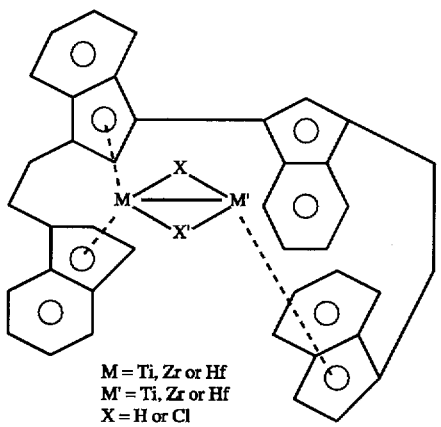

M = Ti, Zr or Hf
M' = Ti, Zr or Hf
X = H or Cl
X' = H or Cl

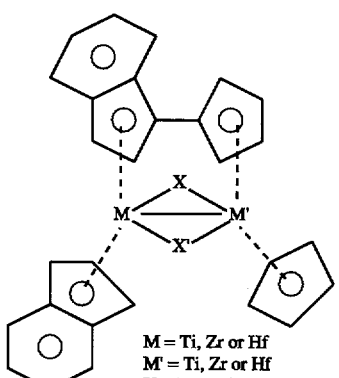

M = Ti, Zr or Hf
M' = Ti, Zr or Hf
X = H or Cl
X' = H or Cl

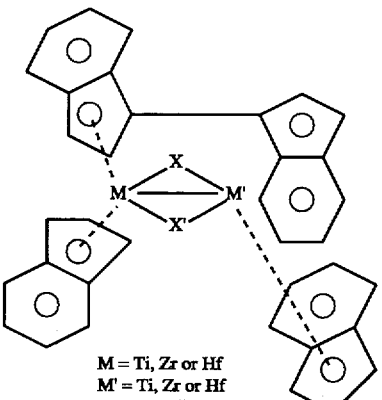

M = Ti, Zr or Hf
M' = Ti, Zr or Hf
X = H or Cl
X' = H or Cl

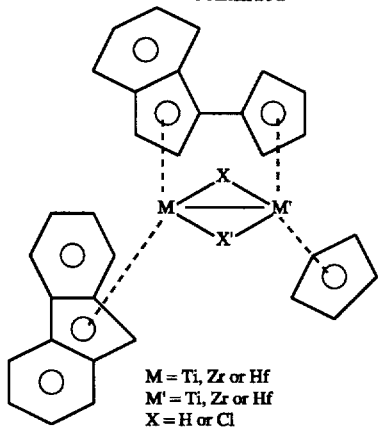

M = Ti, Zr or Hf
M' = Ti, Zr or Hf
X = H or Cl
X' = H or Cl

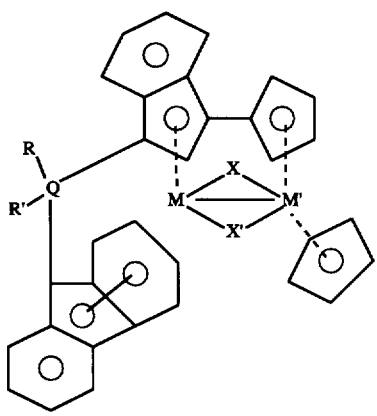

M = Ti, Zr or Hf
M' = Ti, Zr or Hf
X = H or Cl
X' = H or Cl
R = H, CH$_3$ or Ph
R' = H, CH$_3$ or Ph
Q = C or Si

It is also possible to employ derivatives of the above-exemplified compounds that have alkyl, alkoxy, dialkylamino and the like substituents in their ligand moieties. However, it should be understood that the invention is not limited to these compounds.

The activator cocatalyst (B) which is one of the ingredients of the present olefin polymerization catalyst systems according to the invention is defined to be a compound that may react with or work upon either the organo-transition metal compound (A) that is the main ingredient of the present catalyst systems; or a reaction mixture of the organotransition metal compound (A) and an organo-aluminium compound (C); so as to form a catalytically active species effective for olefin polymerization. It should be understood also that the co-catalyst compound is a compound that is weakly coordinated to or interacts with the resulting active species after the formation of said active species of the organo-transition metal compound, but it is then no more reactive with said active species.

As examples of the cocatalyst compounds which may be used in the invention, may be mentioned proton acids of the general formula (4), ionized ionic compound of formula (5), Lewis acids of formula (6) and Lewis acidic compounds of formula (7):

$$[HL^1][B(Ar)_4] \qquad (4)$$

$$[AL^2{}_m][B(Ar)_4] \qquad (5)$$

$$[D][B(Ar)_4] \qquad (6)$$

$$B(Ar)_3 \qquad (7)$$

wherein H is a proton; B represents a boron or aluminium atom; L$^1$ is a Lewis base; L$^2$ is a Lewis base or a cyclopentadienyl group; A is a cation of a metal selected from lithium, iron and silver; D is a carbonium cation or a tropylium cation; Ar is a halogen-substituted C$_{6-20}$ aryl radical; and m is an integer of from 0 to 2.

Alternatively, the cocatalyst compound may be of the general formula (8) and/or (9):

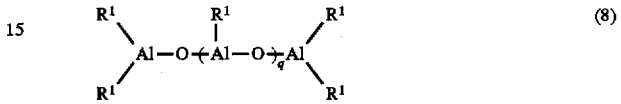

wherein groups R$^1$, which may be the same or different, represent each a hydrogen atom or a C$_{1-20}$ hydrocarbon radical; and q is an integer of from 2 to 60.

Further, the cocatalyst may be a clay mineral. Particular examples of the proton acids of formula (4) which may be mentioned, include:

diethyloxonium tetrakis (pentafluorophenyl)borate, dimethyloxonium tetrakis (pentafluorophenyl) borate, tetramethyleneoxonium tetrakis (pentafluorophenyl) borate, hydronium tetrakis (pentafluorophenyl) borate, N,N-dimethylammonium tetrakis (pentafluorophenyl) borate, tri-n-butylammonium tetrakis (pentafluorophenyl) borate, diethyloxonium tetrakis (pentafluorophenyl) aluminate, dimethyloxonium tetrakis (pentafluorophenyl) aluminate, tetramethyleneoxonium tetrakis (pentafluorophenyl) aluminate, hydronium tetrakis (pentafluorophenyl) aluminate, N,N-dimethylanilium tetrakis (pentafluorophenyl) aluminate, tri-n-butylammonium tetrakis (pentafluorophenyl) aluminate and the like.

Particular examples of the ionized ionic compounds of the general formula (5) which may be mentioned, include:

lithium salts, such as lithium tetrakis (pentafluorophenyl) borate, lithium tetrakis (pentafluorophenyl) aluninate and the like, and ether complexes thereof; ferrocenium salts, such as ferrocenium tetrakis (pentafluorophenyl) borate, ferrocenium tetrakis (pentafluorophenyl) aluminate and the like; and silver salts, such as silver tetrakis (pentafluorophenyl) borate, silver tetrakis (pentafluorophenyl) aluminate and the like. The invention is not limited to these exemplified ones.

Particular examples of the Lewis acids of the general formula (6), which may be mentioned, include:

trityl tetrakis (pentafluorophenyl) borate, trityl tetrakis (pentafluorophenyl) aluminate, tropylium tetrakis (pentafluorophenyl) boate, tropylium tetrakis (pentafluorophenyl) aluminate and the like. These are not limiting example.

Particular examples of the Lewis acidic compounds of the general formula (7) which may be mentioned, include:

tris(pentafluorophenyl) borane, tris(2,3,5,6-tetrafluorophenyl) borane, tris(2,3,4,5-tetraphenylphenyl) borane, tris(3,4,5-trifluorophenyl) borane, phenyl bis (perfluorophenyl) borane, tris(3,4,5-trifluorophenyl) aluminium and the like. Again these are not limiting examples.

Where the activator cocatalyst compound for constitution of the olefin polymerization catalyst system of the invention is a compound of the general formula (8) and/or (9), the compound is an aluminium oxy-compound. In formulae (8) and (9), groups $R^1$ may be the same or different and represent each a hydrogen atom and a $C_{1-20}$ hydrocarbon radical, such as methyl, ethyl, propyl or tert-butyl; and q is an integer of from 2 to 60.

Where the activator cocatalyst of the present olefin polymerization catalyst system is a clay mineral, the clay mineral is generally an inorganic polymeric compound that consists of a tetrahedral unit in which a central silica ion coordinates oxygen ions and an octahedral unit in which a central aluminium, magnesium or iron ion coordinates oxygen or hydroxide ions. The skeleton structures of the clay minerals are not neutralized electrically and thus are charged either positively or negatively on the surface thereof. To compensate such a negative charge, an appropriate amount of cations are attached to the surface. Such the cations are exchangeable. The clay minerals which may be used in the invention should be of such ion-exchangeable properties. Particular examples of the clay minerals which may be used in the invention, include kaolin minerals, such as kaolinite, dickite and halloysite; smectite family, such as montmorillonite, hectorite, beidellite, saponite, teniorite and sauconite; mica family, such as moscovite, paragonite and illite; vermiculite family; dintonite family, such as margarite and clintonite; chlorite family, such as donbassite, cookeite and clinochlore; sepiolite; and palygorskite. The invention is not limited to these exemplified ones. Though the clay minerals are present in nature, they may be artificially synthesized in a highly pure state. In the invention, both the natural and synthesized clay minerals may be used.

When used in the invention, preferably the clay mineral is subjected to pretreatment with chemicals. Examples of the chemical pretreatment include treatment with an acid or alkali, treatment with a salt and treatment with an organic or inorganic compound. The last treatment can result in formation of a composite material. The treatment of the clay mineral with the acid or alkali may not only remove impurities from the mineral, but also may elute part of metallic cations from the crystalline structure of the clay, or may destructively alter the crystalline structure into an amorphous structure. Examples of the acids used for this purpose are Brønstead acids, such as hydrochloric, sulfuric, nitric, acetic acid and the like.

Sodium hydroxide, potassium hydroxide and calcium hydroxide are preferably used as alkali chemical in the alkali pretreatment of the clay mineral.

In the case where the clay mineral is pretreated with a salt or an inorganic or organic compound to give a composite material, the crystalline structure may be retained substantially without being broken and, rather a product that has been modified by ion-exchange may be obtained.

Examples of the inorganic salt compounds that may be used in the pretreatment with salts include ionic halide salts, such as sodium chloride, potassium chloride, lithium chloride, magnesium chloride, aluminium chloride, iron chloride and ammonium chloride; sulfate salts, such as sodium sulfate, potassium sulfate, aluminium sulfate and ammonium sulfate; carbonate salts, such as potassium carbonate, sodium carbonate and calcium carbonate; and phosphate salts, such as sodium phosphate, potassium phosphate, aluminium phosphate and ammonium phosphate. Examples of the organic salt compounds include sodium acetate, potassium acetate, potassium oxalate, sodium citrate, sodium tartarate and the like.

In the case where the clay mineral is converted into an organo composite material by an organic compound during the pretreatment, a compound that yields carbon cation, for example, trityl chloride, tropylium bromide and the like; or a complex compound that yields metallic complex cation, for example a ferrocerium salt and the like; may be used as the organic compound in the pretreatment. In addition to these compounds, onium salts may be used for the same purpose as described hereinafter.

As examples of the inorganic compound used for the synthesis of inorganic composite material, metal hydroxides that yields hydroxide cation, for example, aluminium hydroxide, zirconium hydroxide, chromium hydroxide and the like may be mentioned.

The clay mineral material that is preferably used in the invention is a modified clay compound which comprises a clay mineral-organic ion composite material in which the exchangeable metallic cations originally present in the clay mineral have been exchanged with specific organic cations. Particular examples of the organic cations that may be introduced for modification of the clay minerals, include: ammonium ions, for example aliphatic ammonium cations, such as butyl ammonium, hexyl ammonium, decyl ammonium, dodecyl ammonium, diamyl ammonium, tributyl ammonium, and N, N-dimethyl decyl ammonium; and aromatic ammonium cations such as anilinium, N-methyl anilinium, N,N-dimethyl anilinium, N-ethyl anilinium, N,N-diethyl anilinium, benzyl ammonium, toluidinium, dibenzyl ammonium, tribenzyl ammonium, N,N,2,4,6-pentamethyl anilinium and the like; and also oxonium ions, such as dimethyl oxonium, diethyl oxonium and the like. These examples are not limiting. In order to exchange the exchangeable cations in the clay mineral with selected organic cations, the clay mineral may be brought into reaction with an onium compound comprising the organic cations. Particular examples of the onium compounds which may be used, include: ammonium compounds; for example aliphatic amine hydrochloride salts, such as propylamine HCl salt, isopropylamine HCl salt, butylamine HCl salt, hexylamine HCl salt, decylamine HCl salt, dodecylamine HCl salt, diamylamine HCl salt, tributylamine HCl salt, triamylamine HCl salt, N,N-dimethyl decylamine HCl salt, N,N-dimethyl undecylamine HCl salt and the like; aromatic amine hydrochloride salts, such as aniline HCl salt, N-methylaniline HCl salt, N,N-dimethylaniline HCl salt, N-ethylaniline HCl salt, N,N-diethylaniline HCl salt, o-toluidine HCl salt, p-toluidine HCl salt, N-methyl-o-toluidine HCl salt, N-methyl-p-toluidine HCl salt, N,N-dimethyl-o-toluidine HCl salt, N,N-dimethyl-p-toluidine HCl salt, benzylamine HCl salt, dibenzylamine HCl salt, N,N,2,4,6-pentamethyl aniline HCl salt and the like; hydrofluoric, hydrobromic and hydroiodic acid salts and sulfate salts of the above-listed aliphatic and aromatic amines; and oxonium compounds, such as hydrochloric acid salts of methyl ether, ethyl ether, phenyl ether and the like. However, the invention is not limited to the above-exemplified particular ones. Of the onionium compounds the exemplified ammonium or oxonium compounds, preferably the ammonium compounds and more preferably the aromatic amine salts are employed in the modification of the clay mineral.

The onium compound to be reacted with the clay mineral may be in the isolated form. Alternatively, the onium compound may be formed in situ, for example by contacting the corresponding amine compound, a hetero atom-containing compound, such as an ether or sulfide compound, and a proton acid, such as hydrofluoric, hydrochloric, hydroiodic or sulfuric acid, in the reaction solvent in which the clay mineral is to be pretreated subsequently. The reaction conditions under which the clay mineral is modified by the onium compound are not critical. Also the relative proportions of the reactants used therein are not critical. Preferably, however, the onium compound is employed in a proportion of not less than 0.5 equivalents per equivalent of the cation present in the clay mineral, and more preferably in a proportion of at least equivalent amount. The clay mineral may be used singly or in admixture with other clay mineral or minerals. Also the onium compound may be used singly or in admixture with other onium compound or comounds. The reaction solvent used in the modification pretreatment process may be water or a polar organic solvent. Examples of the organic solvents which may be used suitably, include alcohols, such as methyl alcohol, ethyl alcohol and the like; acetone, tetrahydrofuran, N,N-dimethyl formamide, dimethylsulfoxide, methylene chloride and the like. The solvent may be used singly or as a mixture of two or more. Preferably, water or an alcohol is employed.

The organo-aluminium compound (C) which is a component constituting the present catalyst system together with component (A) and (B), is typically of the following formula (14):

$$(R^3)_3Al \qquad (14)$$

wherein groups R, which may be the same or different, are each a hydrogen atom, amido, alkoxy or a hydrocarbon radical, provided that at least one being a hydrocarbon radical.

Examples of the compounds (C) include trimethyl aluminium, triethyl aluminium, tri-isobutyl aluminium and the like.

In preparation of the catalyst system, the relative proportions of the organo-transition metal compound (A) and the activator cocatalyst (B) and the relative proportions of the organo-transition metal compound (A) and the organo-aluminium compound (C) to be employed are not critical. In the case where the activator cocatalyst (B) is a compound of the general formula (4), (5), (6) or (7), the molar ratio of the organo-transition metal compound (A) to the activator cocatalyst (B) to be used is preferably in the range of from 10:1 to 1:1000, and particularly in the range of from 3:1 to 1:100. The ratio of the organo-transition metal compound (A) to the organo-aluminium compound (C) to be used, though not critical as above-mentioned, is preferably such that the molar ratio of the metal atoms in the former (A) to the metal atoms in the latter (C) is in the range of from 100:1 to 1:100,000, and particularly in the range of from 1:1 to 1:10,000.

In the case where the activator cocatalyst (B) is a compound of the general formula (8) and/or (9), the molar ratio of the organo-transition metal compound (A) to the activator cocatalyst (B) to be used in preparation of the catalyst system is preferably in the range of from 100:1 to 1:1,000,000, and particularly in the range of from 1:1 to 1:100,000. In this case, the ratio of the organo-transition metal compound (A) to the organo-aluminium compound (C), though not critical again, is preferably such that the molar ratio of the metal atoms in the former (A) to the latter (C) is in the range of from 100:1 to 1:100,000, and particularly in the range of from 1:1 to 1:10,000.

In the case where the activator cocatalyst (B) is a clay mineral, the relative proportions of the organo-transition metal compound and the activator cocatalyst (B) are not critical, provided that the latter (B) should be used in a quantity sufficient to appreciably react with the former (A). However, preferably the clay mineral is employed in such a proportion that the amount of cations present in the clay mineral is from 1 to 10,000 times greater than the organo-transition metal compound on the molar basis. If said amount of cations is less than 1 time with respect to the compound (A) on the molar basis, then the catalytic activity would not be improved to an appreciable extent. On the other hand, if the amount of cations is greater than 10,000 times on the same basis, then the activity per unit amount of the resulting catalyst system will become lower relatively, and also it could be necessary to provide an additional step for removing ash from the product polymer in the later stage of the olefin polymerization process employing such a mineral-rich catalyst. Also the ratio of the organo-transition metal compound (A) to the organo-aluminium compound (C) is not critical. However, preferably, the organo-aluminium compound (C) is used in a proportion of less than 100,000 times greater than the transition metal compound (A) on the molar basis. If the aluminium compound (C) is used in a proportion greater than 100,000 times, then it could be necessary to provide an addition step of ash removal in the polymerization process using such an aluminum-rich catalyst system. Considering stabilization of the catalyst system and exclusion of catalyst poison, preferably, the organo-aluminium compound is used particularly in a proportion of from 1 to 10,000 times greater than the transition metal compound on the molar basis.

The method for preparing the catalyst systems from the above-described compounds and the organo-transition metal compound is not limited to any specific one. As an example, may be mentioned a method in which the starting compounds are introduced into a solvent inert thereto or in a solvent comprising a monomer to be polymerized in the presence of the resulting catalyst system and the mixture is stirred to produce a desired catalyst system. The order in which the starting compounds are introduced into the reaction medium is not critical. The temperature and the time for effecting the preparation are not critical again.

Because the organo-transition metal compound (A) has two catalytically active transition metal atoms $M^1$ and $M^2$ in a complex, it is possible to produce a catalyst system having two different active sites in a molecule, so that the polymer growth reaction rate and the termination reaction rate at each of the cites are altered suitably by selecting the involved various conditions, such as polymerization conditions. That is to say that use of the catalyst systems comprising, as a main catalyst component, the organo-transition metal compound enables one to produce an olefinic polymer having a wider and/or multimodal distribution of molecular weight, in particular a polymer of a bimodal molecular weight distribution.

The catalyst systems according to the invention may be used in any conventional manner, such s slurry polymerization, gas-phase polymerization, high-pressure polymerization, solution polymerization bulk polymerization and other known polymerization techniques.

The term "polymerization" as used herein is intended to mean both the homopolymerization and the copolymerization. Therefore the resulting polyolefins include both the homopolymer and copolymers of olefins.

The invention concerns also processes for producing polyolefins using the novel catalyst systems. In these processes, the product polyolefins are produced substantially as polymeric particles.

Onto the olefin polymerization catalyst that is solid, an olefin may be polymerized to give an olefin polymerization catalyst that is solid carrying a prepolymerized polymeric material. Where such a prepolymerized solid catalyst is used in an olefin polymerization process, the resulting polyolefin product has a high bulk density and does not on the inner walls of the reactor vessel. Particularly, this permits stable production of the polymer by the gas-phase or slurry polymerization technique.

Fine particle solid that is used in preparation of the above-described solid catalyst system may be an inorganic or organic support material. Examples of the inorganic support materials include $SiO_2$, $Al_2O_3$, $ZrO$, $B_2O_3$, $CaO$, $ZnO$, $MgCl_2$, $CaCl_2$ and mixtures thereof. Examples of the organic support materials include polyolefins, such as polyethylene, polypropylene, polybutene-1 and polystyrene; and mixtures of such a polyolefin and a polar polymer such as poly(ethylmethacrylate), a polyester and a polyimide. Alternatively, the organic support material may be of a copolymeric composition.

The fine particle support material used in the invention may be of any shape. Preferably, the particle size of the support material is in the range of from 5 to 200 μm, and the pore size ranges from 20 to 100 Angstroms.

The organo-aluminium compound (F) to be used in preparation of the solid, olefin polymerization catalyst system of the invention is, for example, one of the following general formula (15):

$$(R^4)_3Al \qquad (15)$$

wherein groups $R^4$, which may be the same or different, represent each a hydrogen atom, amide, alkoxide or a hydrocarbon radical, provided that at least one thereof is a hydrocarbon radical.

As examples of the aluminium compound (F), may be mentioned, trimethylaluminium, triethyl aluminium, tri-isobutyl aluminium and the like.

The olefin (E) used for preparing the solid, olefin polymerization catalyst system according to the invention may be any one. Preferably, a $C_{2-16}$ α-olefin or cyclic olefin is used. Particular examples include α-olefins, such as ethylene, propylene, 1-butene, 1-pentene, 4-methyl-1-pentene, 1-hexene, and 1-octene; and cyclic olefins, such as norbornene, and norbornadiene. The olefins may be used singly or as a mixture thereof. Where the prepolymerization is effected using two or more olefins, the olefins may be introduced all at once or in sequence into the reaction system. Though the method for effecting the prepolymerization onto the solid, olefin polymerization catalyst is not limited to any specific one, the prepolymerization should be carried out under such the conditions that the solid catalyst (E) and the olefin can be polymerized together. Generally, the prepolymerization maybe effected in the temperature range of −50° to 100° C., preferably −20° to 60° C., and more preferably −10° to 40° C., and at atmospheric or an elevated pressure. Where the prepolymerization is effected in the gas-phase, the process should be conducted in a fluidized state. Where the prepolymerization is in the liquid phase, the process should be conducted with stirring.

The organo-transition metal compounds may be used singly or as a mixture of two or more compounds.

According to the invention, olefins may be polymerizaed in either the gas-phase or liquid phase. In the case where an olefin is polymerized in the gas-phase, an olefinic polymer product of the uniform particle shape may be formed efficiently and at a stable rate. In the case of the liquid-phase polymerization, any conventional organic solvent may be used. Particular examples include benzene, toluene, xylenes, pentane, hexane, heptane and the like. Alternatively, an olefin or olefins themselves that are to be polymerized may be used as solvent, for example propylene, 1-butene, 1-octene, 1-hexene or the like.

The olefins that are polymerizaed in accordance with the invention may be α-olefins, such as ethylene, propylene, 1-butene, 4-methyl-1-pentene, 1-hexene, 1-octene and styrene; conjugated and non-conjugated dienes, such as butadiene, 1,4-hexadiene, 5-ethylidene-2-norbornene, dicyclopentadiene, 4-methyl-1,4-hexadiene and 7-methyl-1, 6-octadiene; and cyclic olefins such as cyclobutene. Further, combinations of three or more olefins may be polymerized together, for example, combinations of ethylene/propylene/ styrene, ethylene/1-hexene/styrene, ethylene/propylene/ ethylidenenorbornene and the like.

The polymerization temperature, time, pressure, monomer concentration and other conditions used in the polymerization processes according to the invention are not limited within specific ranges. For example, a polymerization temperature in the range of −100° to 300° C., a polymerization time of 10 seconds to 20 hours and a polymerization pressure in the range of atmospheric to 3000 $kg/cm^2$ G may be suitably used. It is possible to control the molecular weight of polymer by introducing hydrogen gas into the reaction system during the polymerization process. The polymerization may be conducted in a batch-wise, semi-continuous or continuous operation. The polymerization process may be effected in multi-stages using a sequence of two or more different sets of polymerization conditions.

The resulting polyolefin may be conventionally separated and recovered from the polymerization solvent and then dried to give a desired polyolefin product.

EXAMPLE

The invention will be described in more detail with reference to the following non-limiting examples.

In the examples, all the processes were effected under inert gas atmosphere and all the solvents used in the reactions were appropriately purified or dried or deoxygenated by any suitable conventional technique before use. The product organo-transition metal compounds were identified by $^1$H-NMR in a commercially available NMR spectrometer, Model GPX-400 manufactured by Jeol Ltd.

Melting point of the synthesized polyolefins was determined in a commercially available DSC (Model DSC200 manufactured by SEIKO Co., Ltd.), by heating and maintaining a sample at 200° C. for 5 minutes, quenching it down to 0° C. and raising the temperature at a rate of 10° C./min to read a crystalline melting peak.

Preparation Example 1

Synthesis 1 of organo-transition metal compound (μ-η$^5$:η$^5$-($C_{10}H_8$)[μ-Cl)Zr(η$^5$-$C_5H_5$)]$_2$ Under a stream of nitrogen gas, chips of sodium (0.17 g; 7.5 mMol) were addeds lowly to 17.2 g of mercury with stirring. The mixture was stirred for a further one hour at room temperature. To the resulting reacted mixture in a silvery color, 50 ml of toluene was added. Thereafter, a solution of 1.46 g(5.0 mMol) of zirconocene dichloride dissolved in 50 ml of toluene was added slowly to the mixture, which was stirred overnight at room temperature and then refluxed for a period of 7 hours to give a dark reacted mixture. The liquid mixture was filtered through a Celite medium. From the filtrate, the solvent was stripped off under vacuum. The resulting residue was dissolved again in toluene. The solution was filtered through a G4 filter. From the filtrate, the solvent was stripped off under vacuum until solids deposited slightly. To the incompletely stripped, hexane was added in a sufficient amount to deposit solids completely. The mixture was allowed to stand overnight at −30° C. Then the supernatant was removed gently from the mixture to leave the deposited material, which was vacuum dried to give 0.50 g of a dark purple solid product.

The product was examined by $^1$H-NMR spectroscopy:

$\delta(C_6C_6)$=3.98(pseudotriplet, 4H)

4.94(pseudotriplet, 4H)

5.58(s, 10H)

From these data, the product was identified to be:

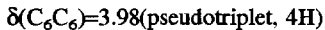

Preparation Example 2

Synthesis 2 of organo-transition metal compound $(\mu\text{-}\eta^5\text{:}\eta^5\text{-}C_{10}H_8)[(\mu\text{-Cl})Zr(\eta^5\text{-}C_5H_5)]_2$

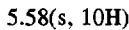

Under a stream of nitrogen gas, a solution of 2.14 g (7.3 mMol) of zirconocene dichloride dissolved in 50 ml of tetrahydrofuran, THF, was chilled down to −78° C. n-BuLi was dissolved in hexane in a concentration of 1.60 Mol per liter. A 9.1 ml portion of the latter solution containing 14.6 mMol n-BuLi was added slowly to the chilled zirconocene dichloride solution. The mixture was stirred at −78° C. for 2 hours. Thereafter, to this react mixture, again a solution of 2.14 g (7.3 mMol) of zirconocene dichloride dissolved in 50 ml of THF was added slowly. Then, the temperature of the mixture was permitted to rise slowly to room temperature. Then the mixture was stirred overnight at room temperature. The thus reacted mixture was stripped under vacuum to remove the solvent. The resulting residue was extracted with toluene. The extracted solution was stripped under vacuum to remove the extraction solvent until solids deposited slightly. To the incompletely stripped extract, hexane was added in a sufficient amount to deposit solids completely. The mixture was allowed to stand overnight at −30° C. Then the supernatant liquid was removed gently from the mixture. The resulting dark red solid material was dried under vacuum to give 1.83 g of a dark red solid product.

The product was examined by $^1$H-NMR spectroscopy:

$\delta(C_6D_6)$=3.98 (pseudotriplet, 4H)

4.94 (pseudotriplet, 4H)

5.58 (s, 10H)

These data correspond completely with the data observed in the previous Preparation Example 1.

Consequently the dark red solid product was identified to be:

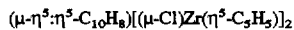

Example 1

An autoclave of a 2-liter capacity was charged with 500 ml of toluene, methylaluminoxan (molecular weight=1121; manufactured by TOSOH AKZO Ltd.) in a quantity of 10 mMol calculated as aluminium atom, and 1.0 ml of a solution of the organo-transition metal compound

(from Preparation Example 2) dissolved in toluene in a concentration of 1.0 mMol/liter. The charged solution contained 1.0 µMol of said transition metal compound. Then the autoclave was supplied with ethylene. Polymerization of ethylene was allowed to proceed at 80° C. for 10 minutes while feeding ethylene to maintain an ethylene pressure of 8 kg/cm$^2$G within the autoclave. The product polymer was obtained at a yield of 37 g.

Example 2

An autoclave of a 2-liter capacity was charged with 500 ml of toluene, methylaluminoxan (molecular weight=1121; manufactured by TOSOH AKZO Ltd.) in a quantity of 2.5 mMol calculated as aluminium atom, and 0.5 ml of a solution of the organo-transition metal compound

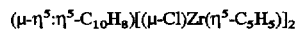

(from Preparation Example 1) dissolved in toluene in a concentration of 1.0 mMol/liter. The charged solution contained 0.5 µMol of said transition metal compound. Then the autoclave was supplied with ethylene. Polymerization of ethylene was allowed to proceed at 80° C. for 30 minutes while feeding ethylene to maintain an ethylene pressure of 4 kg/cm$^2$G within the autoclave. The product polymer was obtained at a yield of 37 g.

Example 3

An autoclave of a 2-liter capacity was charged with 500 ml of toluene, 15 ml of 1-hexene, methylaluminoxan (molecular weight=1121; manufactured by TOSOH AKZO Ltd.) in a quantity of 2.5 mMol calculated as aluminium atom, and 0.5 ml of a solution of the organo-transition metal compound

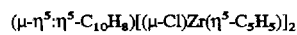

(from Preparation Example 1) dissolved in toluene in a concentration of 1.0 mMol/liter. The charged solution contained 0.5 µmol of said transition metal compound. Then the autoclave was supplied with ethylene. Polymerization was allowed to proceed at 80° C. for 30 minutes while feeding ethylene to maintain an ethylene pressure of 4 kg/cm$^2$G within the autoclave. The product polymer was obtained at a yield of 33 g. The melting point was 124° C.

Example 4

An autoclave of a 2-liter capacity was charged with 500 ml of toluene, 0.14 ml of a solution of tri-isobutyl aluminium dissolved in toluene in a concentration of 0.89 Mol/liter, 2.5 ml of a solution of N,N-dimethylanilinium tetrakis (pentafluoro)phenyl borate dissolved in toluene in a concentration of 1.0 mMol/liter, and 0.5 mol of a solution of the organo-transition metal compound

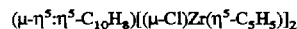

(from Preparation Example 1) dissolved in toluene in a concentration of 1.0 mMol/liter. The above-charged three solutions contained the solute compounds in quantities of 0.125 mMol, 2.5 µmol and 0.5 µMol, respectively. Then the autoclave was supplied with ethylene. Polymerization of ethylene was allowed to proceed at 80° C. for 30 minutes while feeding ethylene to maintain an ethylene pressure of 4 kg/cm$^2$G within the autoclave. The product polymer was obtained at a yield of 31g.

Example 5

An autoclave of a 2-liter capacity was charged with 500 ml of toluene, 15 ml of 1-hexene, 0.14 ml of a solution of tri-isobutyl aluminium dissolved in toluene in a concentration of 0.89 Mol/liter, 2.5 ml of a solution of N,N-dimethylanilinium tetrakis (pentafluoro)phenyl borate dissolved in toluene in a concentration of 1.0 mMol/liter and 0.5 ml of a solution of the organo-transition metal compound

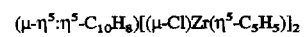

(from Preparation Example 1) dissolved in toluene in a concentration of 1.0 mMol/liter. The above-charged three solutions contained the solute compounds in quantities of 0.125 mMol, 2.5 μMol and 0.5 μMol, respectively. Then the autoclave was supplied with ethylene. Polymerization was allowed to proceed at 80° C. for 30 minutes while feeding ethylene to maintain an ethylene pressure of 4 kg/cm²G within the autoclave. The product polymer was obtained at a yield of 27 g. The melting point was 122° C.

Example 6
Preparation of Modified Clay A

In an autoclave of a 2-liter capacity, 5.0 g of a commercially available highly pure montmorillonite clay under trade name KUNIPIA from Kunimine Kogyo Ltd. Was dispersed in one liter of fully degassed water to give an aqueous suspension, to which 150 ml of an aqueous solution containing 1.9 g (12.1 mMol) of N,N-dimethyl aniline hydrochloride salt was added. The mixture was then stirred for 24 hours, filtered, washed with water and then with ethanol, and dried at room temperature under vacuum to give a modified clay. This will be referred to as "modified clay A".

Preparation of Catalyst Suspension 1

In a 50 ml Schlenk flask, 106 mg of the above-prepared modified clay A was suspended in 10 ml of toluene. To the suspension, 2.0 mMol of tri-isobutyl aluminium was added as a 0.89 Mol/liter toluene solution (in a volume of 2.2 ml). The mixture was stirred at room temperature for 10 minutes. Then, to the mixture, 1.0 ml of a solution of

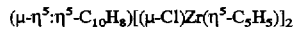

(from Preparation Example 1) dissolved in toluene in a concentration of 1.0 mMol/liter was added, and stirred at room temperature for 20 minutes to give a catalyst suspension. This will be referred to as "catalyst suspension 1".

Ethylene Polymerization

A 2-liter autoclave was charged with 1200 ml of hexane, 3.3 ml of a solution of tri-isobutyl aluminium dissolved in toluene in a concentration of 0.89 Mol/liter (providing 3.0 mMol of said aluminium compound in the autoclave), and the above-prepared catalyst suspension 1. Then the autoclave was supplied with ethylene. Polymerization of ethylene was allowed to proceed at 80° C. for 90 minutes while feeding ethylene to maintain an ethylene pressure of 4 kg/cm²G within the autoclave. The product polymer was obtained at a yield of 5 g.

Example 7
Preparation of Catalyst Suspension 2

In a 50 ml Schlenk flask, 111 mg of the above-prepared modified clay A was suspended in 10 ml of toluene. To the suspension, 2.0 mMol of tri-isobutyl aluminium was added as a 0.89 Mol/liter toluene solution (in a volume of 2.2 ml). The mixture was stirred at room temperature for 10 minutes. Then, to the mixture, 1.0 ml of a solution of

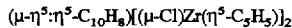

(from Preparation Example 1) dissolved in toluene in a concentration of 1.0 mMol/liter was added, and stirred at room temperature for 20 minutes to give a catalyst suspension. This will be referred to as "catalyst suspension 2".

Ethylene/1-hexene Copolymerization

A 2-liter autoclave was charged with 1200 ml of hexane, 15 ml of 1-hexene, 3.3 ml of a solution of tri-isobutyl aluminium dissolved in toluene in a concentration of 0.89 Mol/liter (providing 3.0 mMol of said aluminiumn compound in the autoclave), and the above-prepared catalyst suspension 2. Then the autoclave was supplied with ethylene. Polymerization was allowed to proceed at 80° C. for 90 minutes while feeding ethylene to maintain an ethylene pressure of 4 kg/cm²G within the autoclave. The product polymer was obtained at a yield of 3 g. The melting point was 123° C.

Example 8
Preparation of Modified Clay B

A commercially available synthetic hectorite under trade name LAPONITE from Nippon Silica Industrial Co., Ltd. was used in place of the highly pure montmorillonite in the procedure of Example 6 to obtain a modified clay. This will be referred to as "modified clay B".

Preparation of Catalyst Suspension 3

A catalyst suspension was prepared using 113 g of the above-prepared modified clay B in place of the modified clay A in the procedure of Example 6. The suspension will be referred to as catalyst suspension 3".

Ethylene Polymerization

A 2-liter autoclave was charged with 1200 ml of hexane, 3.3 ml of a solution of tri-isobutyl aluminium dissolved in toluene in a concentration of 0.89 Mol/liter (providing 3.0 mMol of said aluminium compound in the autoclave), and the above-prepared catalyst suspension 3. Then the autoclave was supplied with ethylene. Polymerization was allowed to proceed at 80° C. for 90 minutes, while feeding an ethylene to maintain an ethylene pressure of 4 kg/cm²G within the autoclave. The product polymer was obtained in a yield of 58 g.

Example 9
Preparation of Catalyst Suspension 4

The procedure of Example 8 was repeated to prepare a catalyst suspension using 121 g of the modified clay B. This will be referred to as "catalyst suspension 4".

Ethylene/1-hexene Copolymerization

A 2-liter autoclave was charged with 1200 ml of hexane, 15 ml of 1-hexene, 3.3 ml of a solution of tri-isobutyl aluminium dissolved in toluene in a concentration of 0.89 Mol/liter (providing 3.0 mMol of said aluminium compound in the autoclave), and the above-prepared catalyst suspension 4. Then the autoclave was supplied with ethylene. Polymerization was allowed to proceed at 80° C. for 90 minutes, while feeding ethylene to maintain an ethylene pressure of 4 kg/cm²G within the autoclave. The product polymer was obtained in a yield of 39 g and was found to have a melting point of 123° C.

As seen from the foregoing, the olefin polymerization catalysts comprising organo-transition metal complexes as a primary catalytic component are very effective in olefin polymerization processes. Use of the catalysts will allow highly efficient production of olefinic polymers and copolymers that are of commercially valuable properties.

The product polymer had Mw=88000 and Mw/Mn=2.85.

Example 10
Preparation of Catalyst Suspension 5

In a 50 ml Schlenk flask, 117 mg of the above-prepared modified clay B was suspended in 10 ml of toluene. To the suspension, 2.0 mMol of trimethyl aluminium was added as a 2.4 Mol/liter toluene solution (in a volume of 0.83 ml). The mixture was stirred at room temperature for 10 minutes. Then, to the mixture, 1.0 ml of a solution of

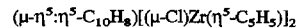

(from Preparation Example 1) dissolved in toluene in a concentration of 1.0 mMol/liter was added, and stirred at room temperature for 17 hours to give a catalyst suspension. This will be referred to as "catalyst suspension 5".

Ethylene Polymerization

A 2-liter autoclave was charged with 1200 ml of hexane, 1.3 ml of a solution of tri-methyl aluminium dissolved in toluene in a concentration of 2.4 Mol/liter (providing 3.0 mMol of said aluminium compound in the autoclave), and the above-prepared catalyst suspension 5. Then the autoclave was supplied with ethylene. Polymerization of ethylene was allowed to proceed at 80° C. for 90 minutes while feeding ethylene to maintain an ethylene pressure of 4 kg/cm²G within the autoclave. The product polymer was obtained at a yield of 14g. In the Examples, the molecular weight of product polymers and the molecular weight distribution thereof were determined by gel permeation chromatography using o-dichlorobenzene as an elute and a polymer concentration of 7 mg per 10 ml of o-dichlorobenzene and a temperature of 140° C. in a commercially available GPC apparatus (Model 150C manufactured by Waters Co.,Ltd.) provided with a TSK-GEL GMHHR-S(S) column.

What is claimed is:

1. An olefin polymerization catalyst system which comprises: A. an organo-transition metal compound represented by the following general formula (1), (2) or (3):

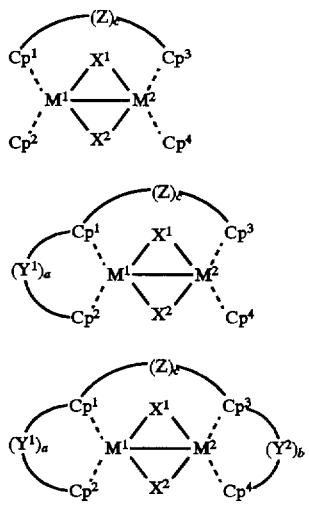

wherein M¹ and M², which may be the same or different, are each a transition metal atom selected from the group consisting of Ti, Zr and Hf, the left-hand Cp¹ and Cp² and the right-hand Cp³ and Cp⁴, which may be the same or different, represent an unsubstituted or substituted radical selected from the group consisting of cyclopentadienyl indenyl and fluorenvl radical, and are bonded to said transition metals M¹ and M², respectively, X¹ and X², which may be the same or different, represent each a hydrogen atom, a C₁₋₂₀ hydrocarbon radical, a halogen atom or a substituent containing an atom or atoms from Group 16 of the periodic table, Y¹ and Y², which may be the same or different, are each a C₁₋₆₀ hydrocarbon radical, a C₁₋₂₀ alkylated and/or arylated silyl radical or a C₁₋₂₀ alkylated and/or arylated siloxyl radical, Y¹ being a crosslink bridging between Cp¹ and Cp², Y² being a crosslink bridging between Cp³ and Cp⁴, Z is a crossliking group bridging between Cp¹ and Cp³ and represent a C₁₋₂₀ hydrocarbon radical, C₁₋₂₀ alkylated and/or arylated silyl radical, or C₁₋₂₀ alkylated and/or arylated siloxyl radical, a and b represent each an integer of 1 or 2, where both a and b are 2, the corresponding Y¹ and Y² groups may be the same or different, c represents an integer of 0 or 1, where c is 1, Cp¹ and Cp² being directly bonded, and where c is 0, a crosslinding group Z being present between Cp¹ and Cp³; and B a cocatalyst.

2. An olefin polymerization catalyst system according to claim 1 which comprises said organo-transition metal comound (A), said cocatalyst (B), and an organo-aluminium compound (C).

3. An olefin polymerization catalyst system according to claim 1 wherein said cocatalyst is represented by the following general formula (4), (5), (6) or (7)

 (4)

 (5)

 (6)

 (7)

wherein H is proton,

B is a boron atom or an aluminium atom,

L¹ is a Lewis base,

L² is a Lewis base or a cyclopentadienyl group,

A is a cation of a metal selected from the group consisting of lithium, iron and silver, D is a carbonium cation or a tropylium cation, Ar is a halogen-substituted C₆₋₂₀ aryl radical, and m is an integer of from 0 to 2.

4. An olefin polymerization catalyst system according to claim 1 wherein said cocatalyst is represented by the following general formula (8) or (9)

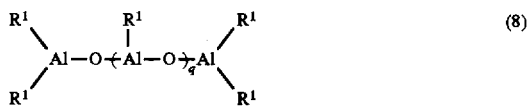 (8)

 (9)

wherein groups R¹, which may be the same or different, represent each a hydrogen atom or an C₁₋₂₀ hydrocarbon radical, and q represents an integer ranging from 2 to 60.

5. An olefin polymerization catalyst system according to claim 1 wherein said cocatalyst comprises a clay mineral or minerals.

6. A solid, olefin polymerization catalyst system which comprises the catalyst consitituting components (A) and (B) as recited in claim 1 that are supported on a fine particle support material (D).

7. A solid, olefin polymerization catalyst system which comprises the catalyst constituting components (A), (B) and (C) as recited in claim 2 that are supported on a fine particle support material (D).

8. A solid, olefin polymerization catalyst system comprising the solid catalyst system as recited in claim 6 onto which an olefin (E) has been prepolymerized.

9. A solid, olefin polymerization system comprising the solid catalyst system as recited in claim 7 onto which an olefin (E) has been prepolymmerized.

10. A solid, olefin polymerization catalyst system comprising the catalyst system of claim 6 and an organoaluminium compound (F).

11. A solid, olefin polymerization catalyst system comprising the catalyst system of claim 7 and an organoaluminium compound (F).

12. A solid, olefin polymerization catalyst system comprising the catalyst system of claim 8 and an organoaluminium compound (F).

13. A solid, olefin polymerization catalyst system comprising the catalyst system of claim 9 and an organoaluminium compound (F).

* * * * *